(12) United States Patent
Bavestrelli et al.

(10) Patent No.: US 8,209,050 B2
(45) Date of Patent: Jun. 26, 2012

(54) METHOD FOR THE CLASSIFICATION OF DEFECTS AND RUNNING OF LAMINATION CYLINDER GRINDING

(75) Inventors: Giovanni Guido Maria Bavestrelli, Milan (IT); Giovanni Boselli, Milan (IT); Andrea Tognoni, Milan (IT); Claudio Trevisan, Cardano Al Campo (IT); William Hill, Dundas (CA); Paul Schumacher, Hamilton (CA)

(73) Assignee: Tenova S.p.A., Milan (IT)

( * ) Notice: Subject to any disclaimer, the term of this patent is extended or adjusted under 35 U.S.C. 154(b) by 105 days.

(21) Appl. No.: 12/669,628

(22) PCT Filed: Jul. 9, 2008

(86) PCT No.: PCT/IB2008/001825
§ 371 (c)(1),
(2), (4) Date: Jun. 25, 2010

(87) PCT Pub. No.: WO2009/010849
PCT Pub. Date: Jan. 22, 2009

(65) Prior Publication Data
US 2010/0291836 A1    Nov. 18, 2010

(30) Foreign Application Priority Data
Jul. 19, 2007    (IT) .............................. MI2007A1449

(51) Int. Cl.
*G06F 19/00*    (2011.01)
*B24B 49/00*    (2012.01)
*B24B 1/00*    (2006.01)

(52) U.S. Cl. ............ 700/164; 700/150; 700/175; 451/5; 451/49; 451/51

(58) Field of Classification Search .................. 700/150, 700/156, 164, 174–175, 178; 451/1, 5, 49, 451/51
See application file for complete search history.

(56) References Cited

U.S. PATENT DOCUMENTS

| 4,942,611 | A | 7/1990 | Kunugi et al. | |
|---|---|---|---|---|
| 5,103,596 | A | 4/1992 | Fujii et al. | |
| 6,577,917 | B1 | 6/2003 | Ronneberger | |
| 6,625,515 | B2 * | 9/2003 | Kerr et al. ...................... | 700/148 |
| 6,741,941 | B2 * | 5/2004 | Obara et al. .................... | 702/35 |
| 2003/0013388 | A1 * | 1/2003 | Buttram ........................ | 451/49 |
| 2005/0208878 | A1 * | 9/2005 | Weiss ................................ | 451/5 |

FOREIGN PATENT DOCUMENTS

| DE | 38 21 412 | 1/1989 |
|---|---|---|
| DE | 199 28 500 | 12/2000 |
| JP | 63 232968 | 9/1988 |

* cited by examiner

*Primary Examiner* — Sean Shechtman
(74) *Attorney, Agent, or Firm* — Oblon, Spivak, McClelland, Maier & Neustadt, L.L.P.

(57) ABSTRACT

A method for classification of defects and running of grinding of lamination cylinders includes identifying defect areas in a map illustrating a plurality of surface measurements of a cylinder. The method includes calculating, for each area identified, a plurality of parameters. The method includes identifying a type of defect associated with the areas identified, on the basis of the parameters calculated. The method includes determining an acceptability threshold of a specific defect for each type of defect identified. The method includes defining a corrective action for each area on the basis of a comparison between the acceptability threshold associated with the type of defect of the area, and a measurement of the surface measurements of the cylinder associated with the area. The method includes determining grinding parameters on the basis of the surface measurements of the cylinder, if the corrective action is a grinding operation to remove the defects.

14 Claims, 2 Drawing Sheets

METHOD FOR THE CLASSIFICATION OF DEFECTS AND RUNNING OF LAMINATION CYLINDER GRINDING

The present invention relates to a method for classifying defects and the running of lamination cylinder grinding.

Lamination cylinders are extremely costly mechanical components particularly critical for obtaining high-quality characteristics of plates and other steelwork products.

Cylinders are moving elements in direct contact with the product, their wear degree is consequently extremely high and their running is particularly costly. Furthermore, their breakage can cause considerable productive damage.

Due to the critical nature of these elements and their cost, an area is envisaged in the steelworks, associated with the lamination lines, destined for their reprocessing and grinding or reconditioning.

This section, called "Roll Shop" consists of a plurality of grinding machines, moving and storage systems of the cylinders and also devices for measuring their geometrical and diagnostic characteristics of the defects generated by their use.

The measuring and diagnostic devices envisage, for example, the use of Non-Destructive Control (NDC) systems. These devices are sometimes implemented in the grinding machines themselves.

The destination of the cylinder is defined from the results of inspections effected by the measuring and diagnostic devices: a cylinder, for example, can be rejected or declassed for use in less critical cages, or reconditioned again for the previous use by means of a grinding operation for its functional reintegration.

In order to keep the processing under control, current operating practice envisages the alternation between grinding operations and inspections.

The case history of the types of defects that can be encountered is extremely vast, considering defects of a mechanical, metallurgical or thermal type.

Mechanical defects can derive, for example, from impacts due to blockages of the head of the ingoing plate or "end strokes" of the outgoing plate, or surface fatigue which causes subsurface cracks, or they can derive from manufacturing defects of the cylinder.

Metallurgical defects can be caused, for example, by work hardenings due to vibrations of the cage or the formation of resonance phenomena between cage and plate.

Thermal-type defects can be formed, for example, following the re-tinning of incandescent plates blocked by hindrances in other sections of the grinding section.

It is also possible for further damage to be caused by the same grinding operation. Wheel burns, various form errors and resonance phenomena between grinding wheel and cylinder can be attributed to this group of defects.

All of the above types of defects create the risk of a catastrophic breakage of the cylinder which must be taken into consideration for determining the grinding parameters, such as the quantity of material to be removed or the frequency of the analysis cycles.

In the case of mechanical defects, for example, especially cracks, these must be totally eradicated.

Thermal defects, on the other hand, can be less critical and may not significantly alter the application safety of the cylinder. The criticalness of thermal defects mainly depends on the cage in which the cylinder is assembled, and results in different thermal defect acceptance thresholds for different cages. These thresholds, however, are always the same or higher than the acceptability thresholds of a mechanical defect.

A treatment practice currently used envisages that the cylinder be characterized in its geometrical dimensions, in terms of error of form and characteristics of roughness and surface hardness, whereas the material of which the cylinder is made is inspected on the surface and in depth with more or less automatic devices using NDC, and in particular eddy currents and ultrasounds.

The grinding operations are subsequently differentiated on the basis of the type of defects encountered, and in particular between cracks of a mechanical type and thermal cracks.

The reason it is advantageous to differentiate between thermal cracks and mechanical cracks is that higher acceptability thresholds can be used for thermal cracks with respect to mechanical cracks.

The classification of defects and application of different thresholds allows less material to be removed from the surface of the cylinders when the defect is higher than the threshold used for mechanical cracks but lower than the threshold used for thermal cracks.

Both defects (mechanical cracks and thermal cracks) can be identified by the measuring and diagnostic devices with eddy currents, but these devices are not capable of differentiating between the two types of defects.

Consequently, analysis is known on the part of an expert of the map of defects read by an eddy current device which is representative of the whole surface of the cylinders, analyzing its form, the distribution, localizing and characterizing the areas which could be part of thermal cracks.

Once the defect has been manually classified, the expert operator decides the processing parameters for the grinding, i.e. how much material to remove from the cylinder to bring the defect below the threshold applicable for that type of defect.

The productivity and replacement costs of rolling-mill cylinders therefore mainly depends on the actual experience and expertise of the operator who is evaluating the type of defect and defines the processing parameters.

At the end of the grinding cycle, an evaluation is made as to whether the cylinder can be accepted as such to be sent to the rolling-mill or if the grinding operation must proceed, or again whether the cylinder is destined for a different cage.

The acceptability of a cylinder for its re-operating largely depends on the type of defect present, its severity and specific acceptability levels of the particular steelworks.

At present, this evaluation is also left to the analysis of an expert operator.

On the basis of the results of these controls and acceptability specifications within the steelworks, it is therefore up to the expert operator to sanction the good result of the grinding operation effected.

The acceptance specifications used in steelworks, as also the acceptability threshold of the type of defect, vary in relation to the type of cylinder, the area of its use and type of defect.

When there are doubts for determining the kind of defect encountered, for defining the entity of the intervention, the expert generally tends to opt for the most serious of those possible. Furthermore, there is a tendency to over-evaluate the severity of a defect, thus removing more material than is necessary and consequently also reducing the real operating life of the cylinder.

All of this significantly influences the general running costs of the rolling mill.

Furthermore, grinding also takes time, and consequently removing useless material is also costly in terms of time, machine and operator.

Finally, the high development rate of the area of rolling-mill cylinders with the frequent insertion of new products based on new materials and different constructive technologies, in addition to materials for grinding which require specific knowledge for their optimum use, should be taken into consideration.

Under these conditions, it is evident that human operators are in any case subject to errors and incorrect interpretations, strictly depending on the level of expertise reached.

A general objective of the present invention is to solve the drawbacks of the known art described above in an extremely simple, economical and particularly function way.

A further objective of the present invention is to identify a classification method of defects and the running of the grinding of lamination cylinders which provides an automatic defect classification, at least with respect to thermal and mechanical cracks.

Another objective of the present invention is to conceive a classification method of defects and the running of the grinding of lamination cylinders which automatically determines the grinding parameters thus eliminating inaccuracies due to the subjective nature of human judgment, and also making these techniques available when operators do not have specific knowledge on the classification process of defects.

Yet another objective of the present invention is to conceive a classification method of defects and the running of the grinding of lamination cylinders which is capable of automatically defining the destination of the cylinder: production, disposal or grinding.

A further objective of the present invention is to provide a classification method of defects and the running of the grinding of lamination cylinders which ensures optimum results even if applied to new products, reducing the necessary learning time to the minimum.

In view of the above objectives, according to the present invention, a method has been conceived for the classification of defects and the running of the grinding of lamination cylinders, having the characteristics specified in the enclosed claims.

The characteristics of the present invention and its advantages with respect to the known art will appear more evident from the following description, referring to the enclosed drawings, which illustrate a method for the classification of defects and the running of the grinding of lamination cylinders implemented according to the innovative principles of the invention itself.

Figure 1:
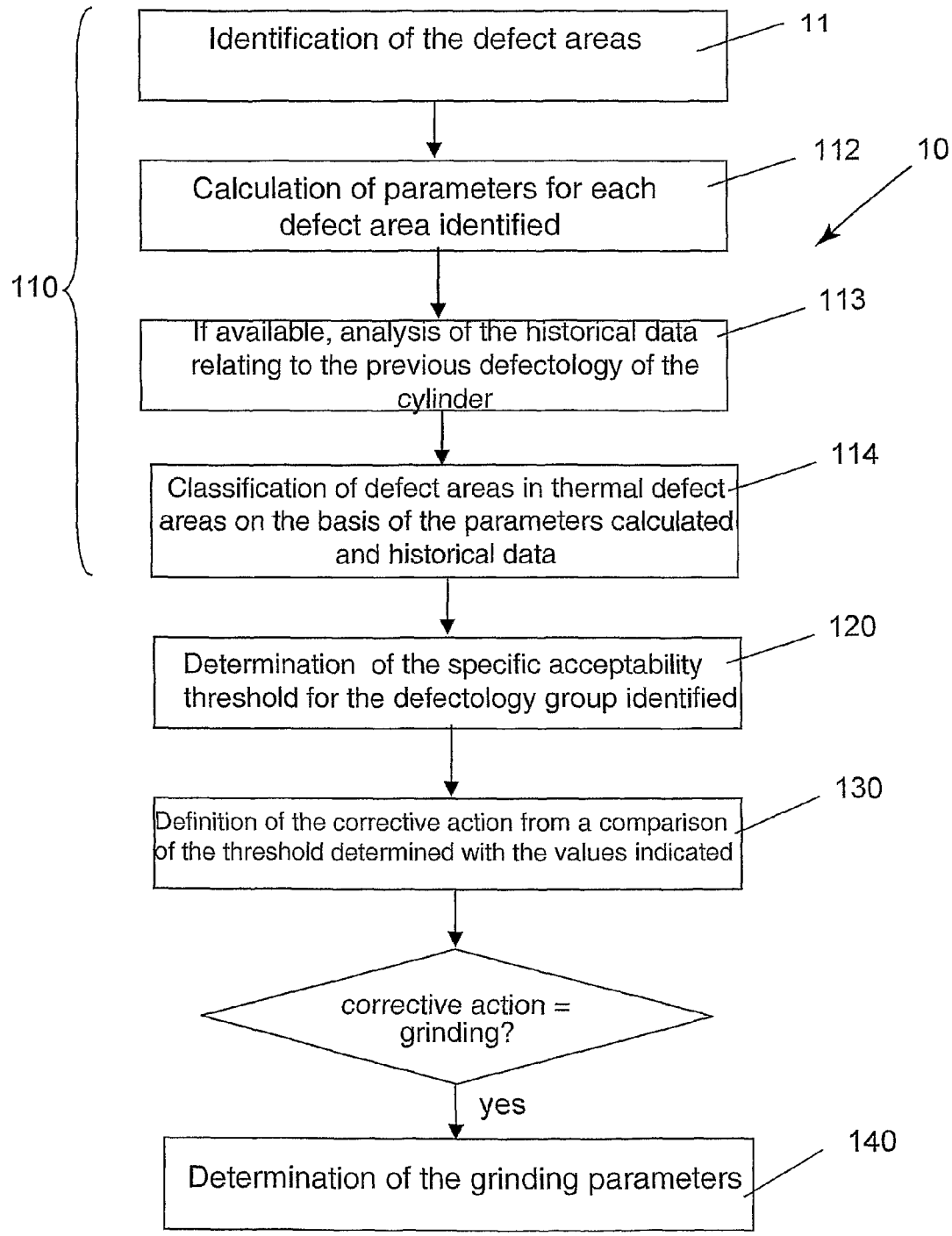
FIG. 1 is a block scheme which illustrates the method for the classification of defects and the running of the grinding of lamination cylinders according to the present invention.
Figure 2:
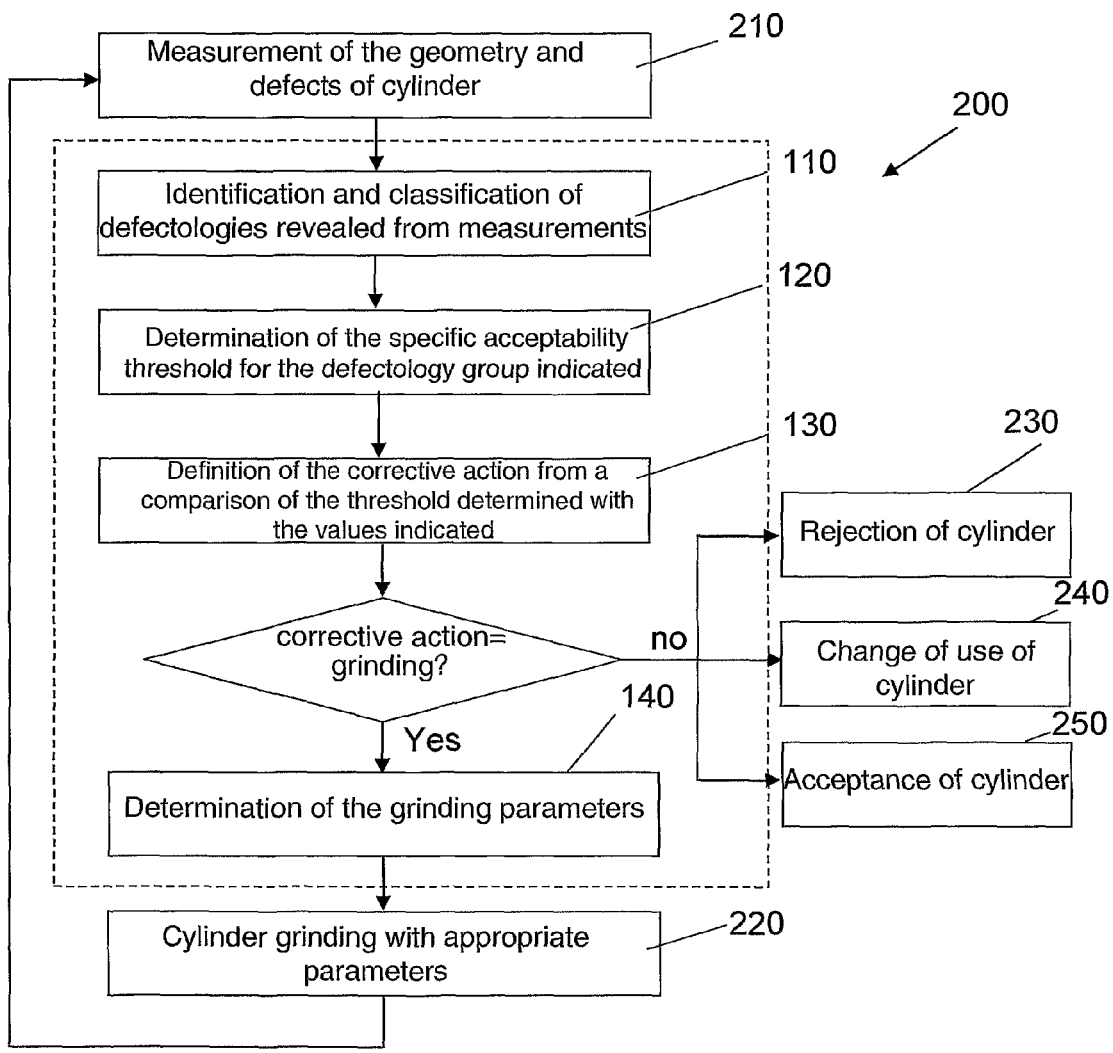
FIG. 2 is a block scheme which illustrates a management process for recuperating damage to lamination cylinders using the method according to the present invention.

With reference to the drawings, the method 100 for the classification of defects and the running of the grinding of lamination cylinders in question falls within the scope of a process 200 for managing the recuperation of damage of lamination cylinders starting from measurement data revealed during the first phases of said process 200.

The method 100 for the classification of defects and the running of the grinding of lamination cylinders according to the invention is capable of making this process 200 completely automatic as resort must no longer be made to the intervention and evaluation of an expert operator.

The management process for recuperating damage to lamination cylinders is preferably based on the joint analysis of the results deriving from a geometrical analysis and at least a Non-Destructive Control measuring and diagnostic device.

This measuring and diagnostic device is preferably implemented on a grinding machine.

The process begins with the obtaining 210 of starting data such as, for example, the geometrical characteristics, characteristics relating to the type of defect, type of cylinder and its historical data.

The significant data acquired by the Non-Destructive Controls, and in particular ultrasounds and eddy currents, which indicate the entity and depth of the defects, are used for forming defectological maps.

For this purpose, the surface of the cylinder is divided into measurement sub-areas, for example with dimensions of 4 mm along the extension of the cylinder parallel to its axis, and 1.5° along its circumference.

Each measurement sub-area is represented in a map cell.

The values acquired for each cell are compared with various appropriate thresholds which serve to classify the cells into cells containing critical defects, cells containing non-critical defects but to be kept in consideration, so-called "almost-defects", and cells not containing critical defects.

These thresholds also take into account measurements of the background noise which are not identified as defects and are consequently ignored.

The thresholds are established on the basis of criteria deriving from experience and depend on the type of cylinder, the material of the cylinder, the cage, the rolling mill and distribution of the defects themselves, as for the background noise.

Furthermore, for isolated defects, which are read in the map as cells with defects surrounded by defect-free cells, different thresholds are applied than those applied for areas with a higher concentration of defects.

Each cell is then classified as containing a defect, an almost-defect or no defect.

After the classification of the cells, they are coloured differently in relation to the severity of the relative defect revealed and therefore relative category to which they belong.

The maps thus obtained from the Non-Destructive Controls can be superimposed on maps resulting from the geometric measurements, which can indicate possible errors of form.

It is possible to superimpose other specific mappings such as, for example, for the determination of chattering-type surface defects and, if necessary, select corresponding corrective actions.

As an alternative to superimposing a plurality of maps, it is possible to represent the results acquired by the measurements through a single map on which the most significant results of the various measurements effected are arranged as successive layers.

The classification and grinding method 100 according to the invention starts from these maps resulting from the measurements, analyzes them and compares them with other measurements memorized over a period of time for the same cylinders.

On the basis of these maps representing the most important of the various measurements effected, the defects represented therein are recognized and classified 110 in order to determine the corrective actions to be adopted.

The method used is the analysis of the map of cylinders, identification of the defect areas, for example, rectangular, comparison of the characteristics of the areas thus obtained with the predefined characteristics of the rectangles that identify thermal cracks, and analysis of the rectangles.

Once a certain category of defect criticalness has been associated with each cell, an interpretation of the distribution of the classified cells is effected to identify 111 the areas of the cylinder analyzed in which defects can be found.

Cells with defects, with other cells containing defects adjacent, are grouped into larger areas, for example rectangular, called defect areas.

An expansion criterion is also used, according to which cells containing defects are connected to each other, if close, even if there are cells not containing defects among them. The expansion criterion occurs in two directions, horizontally (i.e. along the axis of the cylinder) and vertically (i.e. along the circumference of the cylinder), and depends on various parameters, such as the maximum distance (horizontal and vertical) between the cells with defects which can be grouped into a single area.

Cells with almost-defects, i.e. cells containing defects which are not significant but which can indicate the continuation of the faulty area towards other areas with significant defects, are also taken into consideration in the expansion.

The expansion criterion also considers defects and almost-defects differently, i.e. it applies different parameters in the two cases.

In particular, the main parameter is the number of cells to be evaluated in the expansion when defects close to a particular defect are sought, to then connect the two cells in a single area. This parameter can be different for defects and almost-defects.

The defects grouped in the maps into defect areas, contained in rectangles, for example, are subsequently analyzed 112, 113 and classified 114 into thermal or mechanical defects.

Parameters are calculated 112 for each defect area, such as the percentage of cells containing defects within the area, the average defect severity indicated, the maximum severity of the defect and the position in which the defect acquires this maximum severity, the dimension of the rectangle (width and height) and its position on the surface of the cylinder.

Once the values of said parameters are available, the classification procedure 114 analyzes the areas and selects those that satisfy the characteristics of the thermal defects and those that satisfy the characteristics of the mechanical defects.

The thermal defects have a certain minimum and maximum length and also a minimum and maximum width, and do not normally reach the edges of the cylinders.

The thermal defects can in turn be divided into "core", i.e. centre of the thermal defect, and "fringe", i.e. peripheral area around the thermal defect where the lower temperature has caused lesser damage to the cylinder.

There are also "residual" thermal defects, i.e. thermal defects which, after grinding operations, have changed characteristics and are typically indicated by more scattered cells containing lower defect values.

The classification 114 effected distinguishes thermal defects, further sub-classifying them as "core", "fringe" and residual", from all the rest.

The remaining defect areas represented on the map are in turn analyzed to verify whether they satisfy the requisites of mechanical defects. These are characterized by a minimum height or width, a maximum height or width and percentage of the points above the threshold.

If these areas satisfy the characteristics of mechanical defects, they are classified as such. Otherwise, if they are not classified as either thermal defects or mechanical defects, they are ignored.

At the end of the classification into types of defects, the historical data of the cylinders are analyzed 113, i.e. all the maps of previous defects, with relative defect areas classified.

This is essential for identifying residues of previous thermal defects, if the classification criteria 114 indicated above are not sufficient, for example because the cylinder has been ground various times after the formation of the thermal defect.

In this way, if all the thermal areas previously classified are known, it can be deduced that a defect found in an area previously classified as a thermal defect area, in reality could be a residue of said thermal defect, and not a new mechanical defect as could otherwise be concluded.

The classification 114 into types of defects effected, is represented in the map which indicates the surface of the cylinder using different colours depending on the classification of the area into thermal (core, fringe and residual) or mechanical.

After the classification 110 has been effected, the corresponding acceptability threshold is selected 120 for each defect, taking into account the internal practice of the particular operating environment (steelworks) and thresholds indicated in the operating specifications. The acceptability threshold of the various defectologies is then implemented "ad hoc", in relation to the severity of the internal acceptability specifications.

This threshold also varies in relation to the type of cylinder and site of its use.

Once the particular acceptability threshold applicable has been determined 120, the most appropriate corrective action is defined 130 on the basis of a comparison between the data measured and the relative threshold.

The corrective action can be selected from one of the following:

grinding 220 the cylinder in order to restore it to its previous use;

changing the use of the cylinder 240 with the specification of moving it to a less critical lamination cage:

discarding 230 the cylinder as unusable; or accepting 250 the cylinder as ready for use.

Should the cylinder be destined for being ground 220, the automatic definition 140 of the grinding parameters is effected, such as the recovery distance, i.e. the quantity of material to be removed during the relative phase.

Once the maximum defect severity within each defect area (thermal or mechanical) is known, the quantity of material to be removed for eliminating the maximum defect within the specific area, is calculated for each area. This calculation takes into consideration the type of defect (thermal or mechanical), the type of cylinder, the type of material, the cage and rolling mill.

When the quantity of material to be removed for each single area has been established, the highest value is selected and this represents the material to be removed from the cylinder, i.e. the reduction in the diameter, also called recovery distance, to be effected through the grinding operation.

This value is subsequently passed to the grinding machine which automatically removes the material calculated.

Once a first grinding cycle has been effected, the cylinder is again subjected to measurement 210 and analysis of the measurements effected according to the method 100, object of the invention, in order to evaluate whether a further grinding cycle is necessary or not.

When the necessary grinding cycles have been completed, the historical data of the cylinder are updated and the cylinder is transferred for subsequent use in the rolling mill.

The cylinder may otherwise be discarded 230 when it is estimated that the defects are too large for being removed from a normal grinding operation.

In this case, the cylinder is removed and sent to a lathe or a particular grinding operation is planned or the cylinder is rejected.

Finally, movement 240 to a different lamination cage occurs when the cylinder, although having defects greater than the threshold granted by the cage to which it has been assigned, does not exceed the thresholds of another cage where it could be assembled. Consequently, instead of being ground, the cylinder can be assigned to another cage, in this way saving material which could be removed during the grinding.

In a preferred implementation, the analysis phase of the maps for classifying 110 the defects and the selection phase 130 of the optimum corrective action, can be implemented through artificial intelligence technologies such as neural networks or expert systems.

With this embodiment, there is a particularly high response rate, which is such as to allow a consistent reduction in the total time associated with the management process 200 of the recovery of damage to lamination cylinders.

By simply intervening on the regulations and basic knowledge, it is also possible to easily and rapidly adjust the classification 110 and selection 140 phases of the grinding parameters to the newly modified operating demands required by the technical evolution of the field.

These new operating requirements can be due, for example, to the use of new cylinder material, new configurations of the cylinder, new construction technologies or new equipment such as high rigidity grinding-wheels, new Non-Destructive Control systems assembled in the machine and so forth.

With the method described, it is also possible to simultaneously treat the results of various non-destructive investigations. This is particularly advantageous as it is often the superimposition of several indications that can give a clear identification of the defectology group present.

If various defects are revealed, the most serious defect case history will preside over the others. The recovery action 220-250 is consequently primarily directed at solving the most serious occurrence, typically deriving from the geometric analysis and/or that with eddy currents or ultrasounds.

In any case, in relation to the limitation freedom degrees available, other defect occurrences revealed also influence the selection and recovery procedures of the cylinder.

From the above description with reference to the figures, it is evident how a method for the classification and running of the grinding of lamination cylinders according to the invention is particularly useful and advantageous.

From a strictly economical point of view, the method allows a better management of the set of cylinders prolonging their operating life and/or reducing the probability of breakage or catastrophic operating explosion.

Even if human intervention is possible, and is actually necessary in a first training phase, the method makes it possible to operate automatically leading to a reduction in the number of expert operators necessary for the running of the entire Roll Shop.

Furthermore, the use of a method for the classification of defects and the running of the grinding of lamination cylinders according to the invention in which a homogeneous identification of the defect and selection of the intervention strategies based on fixed regulations, are effected, eliminates the necessity of having to introduce unpredictable human selections into the functionality projections of the line, allowing the statistic behaviour of the production line to be more programmable and predictable.

The interpretation effected automatically also allows the evaluations to conform with the "most expert" opinion, among the users even if virtual and not physical.

In current practice, on the other hand, situations of uncertainty due to different levels of experience and at times insufficient arise among the operators and there is consequently the necessity of removing excessive and unnecessary material. As already mentioned, this kind of choice is not acceptable considering the present costs of materials.

The objective specified in the preamble of the described is therefore achieved.

The method for the classification of defects and the running of the grinding of lamination cylinders according to the invention can naturally have different implementations from those described and illustrated for purely illustrative and non-limiting purposes.

The protection scope of the invention is therefore delimited by the enclosed claims.

The invention claimed is:

1. A method for classification of defects and running of grinding of lamination cylinders, comprising:
    a) identifying defect areas in a map illustrating a plurality of surface measurements of a cylinder by
        a1) subdividing said map into a plurality of cells each corresponding to a measurement sub-area of the surface of said cylinder;
        a2) classifying said plurality of cells in relation to a criticalness of a defect measured in a corresponding measurement sub-area; and
        a3) grouping a combination of cells of said plurality of cells associated with a same defect criticalness and arranged at a pre-established reciprocal distance, said pre-established reciprocal distance differing in relation to the defect criticalness associated with said cells;
    b) calculating, for each defect area identified, a plurality of parameters;
    c) identifying a type of defect associated with said defect areas identified, on the basis of the parameters calculated;
    d) determining an acceptability threshold of a specific defect for each type of defect identified;
    e) defining a corrective action for each defect area on the basis of a comparison between said acceptability threshold associated with the type of defect of said defect area, and a measurement of said plurality of surface measurements of the cylinder associated with said defect area; and
    f) determining grinding parameters on the basis of said surface measurements of said cylinder, when the corrective action defined in e) is a grinding operation to remove the defects.

2. The method for classification of defects and running of grinding of lamination cylinders according to claim 1, wherein said identifying a type of defect associated with said defect areas identified in c) is additionally based on historical data relating to previous defects of said cylinder.

3. The method for classification of defects and running of grinding of lamination cylinders according to claim 1 or 2, wherein said classifying said cells with the same criticalness in a2) includes subdividing said cells into the following categories:
    "defect cells",
    "almost defect cells",
    "defect-free cells".

4. The method for classification of defects and running of grinding of lamination cylinders according to claim 1, wherein said parameters include:
- a percentage of "defect cells" within said defect area;
- an average severity of the cells of said defect area,
- a maximum defect severity of the cells of said defect area,
- a position, in said defect area, of the cell corresponding to the maximum defect severity of said defect area;
- a dimension of said defect area; and
- a position on the surface of the cylinder corresponding to said defect area.

5. The method for classification of defects and running of grinding of lamination cylinders according to claim 1, wherein said types of defect which are associated with said defect areas include thermal defects and mechanical defects.

6. The method for classification of defects and running of grinding of lamination cylinders according to claim 1, wherein said acceptability thresholds of the defect are determined on the basis of operating specifications of a steelworks.

7. The method for classification of defects and running of grinding of lamination cylinders according to claim 1, wherein said for determining the grinding parameters in f) includes:
- f1) calculating a recovery distance for each defect area, on the basis of a defect severity associated with said defect area; and
- f2) selecting a maximum recovery distance between said recovery distances calculated for each defect area.

8. The method for classification of defects and running of grinding of lamination cylinders according to claim 7, wherein said calculating the recovery distance includes considering the following factors:
- type of defect;
- type of cylinder;
- type of material;
- type of cage; and
- type of rolling mill.

9. A non-transitory computer-readable memory storing a program for a processor, the program comprising code portions for implementing the method according to claim 1 when said program is actuated by said processor.

10. A process for managing a recovery of damage to lamination cylinders comprising:
- i) acquiring measurement data of a cylinder;
- ii) analyzing the measurement data by applying the method for classification of defects and running of grinding of lamination cylinders according to claim 1; and
- iii) effecting one of the following corrective actions:
  - grinding the cylinder;
  - discarding the cylinder;
  - moving the cylinder to a less critical lamination cage;
  - accepting the cylinder as ready for use.

11. The process for managing a recovery of damage to lamination cylinders according to claim 10, wherein following a grinding phase of the cylinder, the acquiring measurement data and analyzing the measurement data are repeated.

12. A non-transitory computer-readable memory storing a program for a processor, the program comprising code portions for implementing the process according to claim 10 when said program is actuated by said processor.

13. A Roll Shop for running a recovery of damage to lamination cylinders, comprising at least one grinding machine and the processor configured to actuate the program for the processor according to claim 9 or 12, said processor being connected to at least one None Destructive Control measuring and diagnostic device.

14. The Roll Shop according to claim 13, wherein said processor is also connected to a geometric analysis device.

* * * * *